US012555597B2

(12) United States Patent
Suzuki et al.

(10) Patent No.: US 12,555,597 B2
(45) Date of Patent: Feb. 17, 2026

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Sho Suzuki, Hachioji Tokyo (JP); Takayuki Kawabe, Sagamihara Kanagawa (JP); Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/822,275

(22) Filed: Sep. 1, 2024

(65) Prior Publication Data
US 2025/0292793 A1   Sep. 18, 2025

(30) Foreign Application Priority Data

Mar. 14, 2024  (JP) .................. 2024-040105

(51) Int. Cl.
*G11B 5/55* (2006.01)
(52) U.S. Cl.
CPC .................. *G11B 5/5521* (2013.01)
(58) Field of Classification Search
None
See application file for complete search history.

(56) References Cited

U.S. PATENT DOCUMENTS

| | | | |
|---|---|---|---|
| 5,126,895 A | 6/1992 | Yasuda | |
| 6,178,058 B1 | 1/2001 | Pan | |
| 6,310,741 B1 | 10/2001 | Nishida | |
| 6,654,198 B2 * | 11/2003 | Liu | G11B 5/59627 360/77.04 |
| 7,154,690 B1 | 12/2006 | Brunnett | |
| 8,896,959 B1 * | 11/2014 | Kashiwagi | G11B 5/5582 360/75 |
| 9,240,198 B1 * | 1/2016 | Hara | G11B 5/012 |
| 9,728,215 B2 * | 8/2017 | Kanamaru | G11B 5/596 |
| 10,051,451 B1 * | 8/2018 | Ray | H04W 4/90 |
| 10,910,013 B1 * | 2/2021 | Kawabe | G11B 20/1217 |
| 11,862,204 B2 * | 1/2024 | Furuhashi | G11B 21/106 |

(Continued)

FOREIGN PATENT DOCUMENTS

JP   H02-297702 A   12/1990

*Primary Examiner* — Fred Tzeng
(74) *Attorney, Agent, or Firm* — Kim & Stewart LLP

(57) ABSTRACT

A controller of a magnetic disk device executes an integration operation each time a magnetic head passes through a servo sector during a write operation for a write target section of a first track among a plurality of tracks, so long as a positioning error amount in a servo sector that was most recently passed through by the magnetic head is within a range of an error threshold. The integration operation includes calculating an integrated offset amount by adding up positioning error amounts in two or more servo sectors including at least the servo sector that was most recently passed through by the magnetic head among all servo sectors that were passed through by the magnetic head during the write operation. The controller executes a protection operation for protecting data of a second track adjacent to the first track among the plurality of tracks based on the integrated offset amount.

20 Claims, 9 Drawing Sheets

(56) References Cited

U.S. PATENT DOCUMENTS

| | | | |
|---|---|---|---|
| 11,887,633 B2* | 1/2024 | Kawabe | G11B 5/59627 |
| 11,955,146 B2* | 4/2024 | Tagami | G11B 5/59638 |
| 12,176,002 B1* | 12/2024 | Maeto | G11B 20/1217 |
| 12,183,375 B1* | 12/2024 | Kawabe | G11B 5/59627 |
| 2014/0168806 A1 | 6/2014 | Dhanda | |
| 2015/0294690 A1* | 10/2015 | Kanamaru | G11B 5/596 360/31 |
| 2018/0088838 A1* | 3/2018 | Sato | G06F 3/0653 |
| 2019/0378543 A1* | 12/2019 | Maeto | G11B 21/08 |
| 2022/0406331 A1* | 12/2022 | Obara | G11B 20/1217 |

* cited by examiner

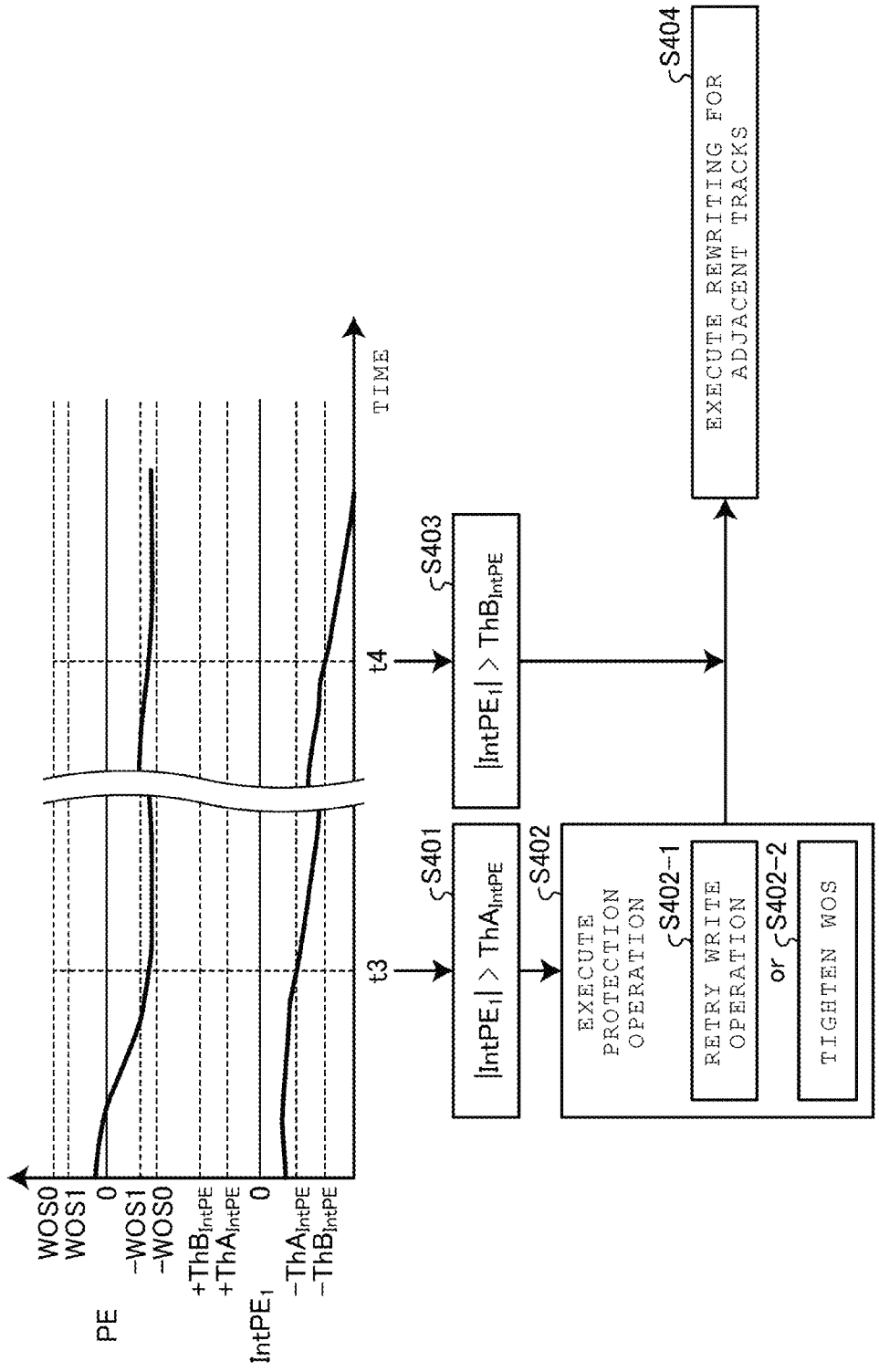

MAGNETIC DISK DEVICE

CROSS-REFERENCE TO RELATED APPLICATION(S)

This application is based upon and claims the benefit of priority from Japanese Patent Application No. 2024-040105, filed Mar. 14, 2024, the entire contents of which are incorporated herein by reference.

FIELD

Embodiments described herein relate generally to a magnetic disk device.

BACKGROUND

In magnetic disk devices of the related art, a write permission range is set along a write destination track (referred to as a target track) during a write operation. The magnetic disk device stops a write operation when the position of its magnetic head deviates from the write permission range. Thereby, data of tracks adjacent to a target track is protected from destruction.

DESCRIPTION OF THE DRAWINGS

FIG. 11 is a diagram showing a protection operation according to a second embodiment.

DETAILED DESCRIPTION

In general, according to one embodiment, a magnetic disk, a magnetic head, and a controller are provided. The magnetic disk includes a plurality of concentric tracks and a plurality of servo sectors disposed at intervals on the plurality of tracks. The magnetic head performs writing to and reading from the plurality of tracks. The controller executes an integration operation each time the magnetic head passes through a servo sector during a write operation for a first section, so long as a positioning error amount in a servo sector that was most recently passed through by the magnetic head is within a range of a first positioning error threshold value. The first section is a write target section of a first track among the plurality of tracks. The integration operation includes calculating an integrated offset amount by adding up positioning error amounts in two or more servo sectors including at least the servo sector that was most recently passed through by the magnetic head among all servo sectors that were passed through by the magnetic head during the write operation. The controller executes a first protection operation for protecting data of a second track adjacent to the first track among the plurality of tracks based on the integrated offset amount.

Magnetic disk devices according to embodiments will be described in detail below with reference to the accompanying drawings. The scope of this disclosure is not limited to these embodiments.

First Embodiment

Figure 1:
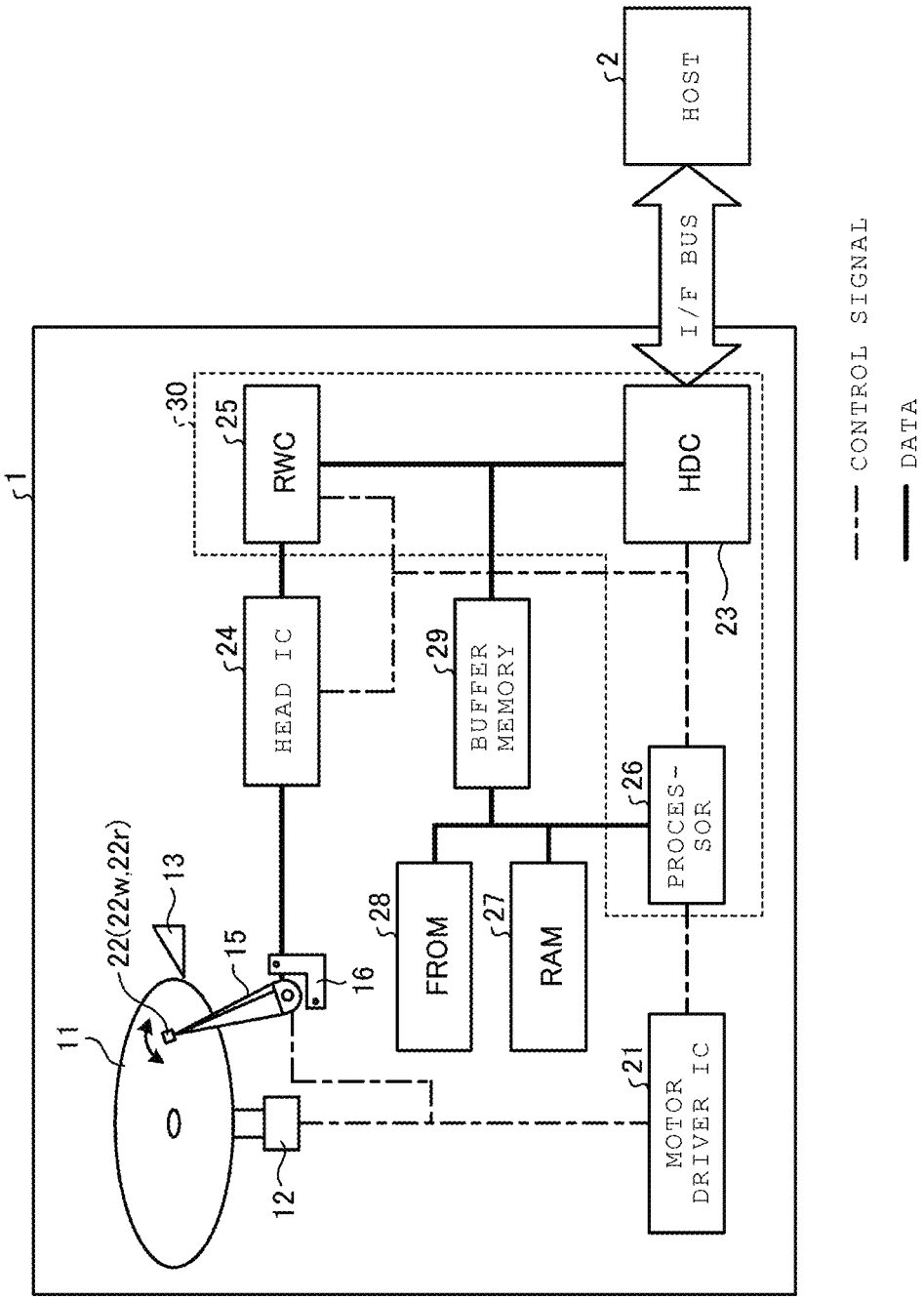
FIG. 1 is a schematic diagram showing an example of a configuration of a magnetic disk device according to a first embodiment.

FIG. 1 is a schematic diagram showing an example of a configuration of a magnetic disk device 1 according to a first embodiment.

The magnetic disk device 1 is connected to a host 2. The magnetic disk device 1 can receive access commands such as a write command and a read command from the host 2.

The magnetic disk device 1 includes a magnetic disk 11 having a surface on which a recording surface is formed. The magnetic disk device 1 writes and reads data to and from the magnetic disk 11 (more precisely, the recording surface of the magnetic disk 11) in response to the access command. Although the magnetic disk device 1 may include a plurality of magnetic disks 11, the magnetic disk device 1 includes one magnetic disk 11 for the purpose of simplifying the description and illustration of the embodiment.

Data is written and read via a magnetic head 22. Specifically, in addition to the magnetic disk 11, the magnetic disk device 1 includes a spindle motor 12, a motor driver integrated circuit (IC) 21, the magnetic head 22, an actuator arm 15, a voice coil motor (VCM) 16, a ramp 13, a head IC 24, a read write channel (RWC) 25, a random-access memory (RAM) 27, a flash read-only memory (FROM) 28, a buffer memory 29, a hard disk controller (HDC) 23, and a processor 26.

The magnetic disk 11 is rotated at a predetermined rotational speed by the spindle motor 12 attached to a rotating shaft of the magnetic disk 11. The spindle motor 12 is driven by the motor driver IC 21.

The motor driver IC 21 controls the rotation of the spindle motor 12 and the rotation of the VCM 16.

The magnetic head 22 writes and read data to and from the magnetic disk 11 by using a write element $22w$ and a read element $22r$ provided therein. Further, the magnetic head 22 is attached to the tip of the actuator arm 15. The magnetic head 22 is moved along a radial direction of the magnetic disk 11 by the VCM 16 driven by the motor driver IC 21.

When, for example, the rotation of the magnetic disk 11 is stopped, the magnetic head 22 is moved onto the ramp 13. The ramp 13 is configured to hold the magnetic head 22 at a position spaced apart from the magnetic disk 11.

During reading, the head IC 24 amplifies and outputs a signal read from the magnetic disk 11 by the magnetic head 22, and supplies the amplified signal to the RWC 25. Further, the head IC 24 amplifies a signal corresponding to write target data supplied from the RWC 25 and supplies the amplified signal to the magnetic head 22.

The HDC 23 controls the transmission and reception of data to and from the host 2 via an I/F bus, controls the buffer memory 29, and performs error correction processing on read data, for example.

The buffer memory 29 is used as a buffer for data transmitted and received to and from the host 2. For example, the buffer memory 29 is used to temporarily store data written to the magnetic disk 11 or data read from the magnetic disk 11.

The buffer memory 29 is configured with, for example, a volatile memory capable of a high-speed operation. The type of memory constituting the buffer memory 29 is not limited to a specific type. The buffer memory 29 may be configured with, for example, a dynamic random access memory (DRAM), a static random access memory (SRAM), or a combination thereof.

The RWC 25 modulates the write target data supplied from the HDC 23 and supplies the modulated data to the head IC 24. Further, the RWC 25 demodulates a signal read from the magnetic disk 11 and supplied from the head IC 24 and outputs the signal to the HDC 23 as digital data.

The processor 26 is, for example, a Central Processing Unit (CPU). The RAM 27, the flash read-only memory (FROM) 28, and the buffer memory 29 are connected to the processor 26.

The FROM 28 is a nonvolatile memory. The FROM 28 stores firmware (program data), various operating parameters, and the like. The firmware may be stored on the magnetic disk 11.

The RAM 27 is configured with, for example, a DRAM, an SRAM, or a combination thereof. The RAM 27 is used by the processor 26 as an operating memory. The RAM 27 is used as an area where firmware is loaded and an area where various pieces of management data are stored.

The processor 26 performs the overall control of the magnetic disk device 1 in accordance with the firmware stored in the FROM 28 or on the magnetic disk 11. For example, the processor 26 loads the firmware from the FROM 28 or the magnetic disk 11 into the RAM 27 and controls the motor driver IC 21, the head IC 24, the RWC 25, the HDC 23, and the like in accordance with the loaded firmware.

The configuration including the RWC 25, the processor 26, and the HDC 23 can also be regarded as a controller 30. The controller 30 may be configured as a system-on-a-chip (SoC). The controller 30 does not necessarily need to be configured as an SoC. In addition to these, the controller 30 may include other elements (for example, the RAM 27, the FROM 28, the buffer memory 29, or the RWC 25).

Figure 2:
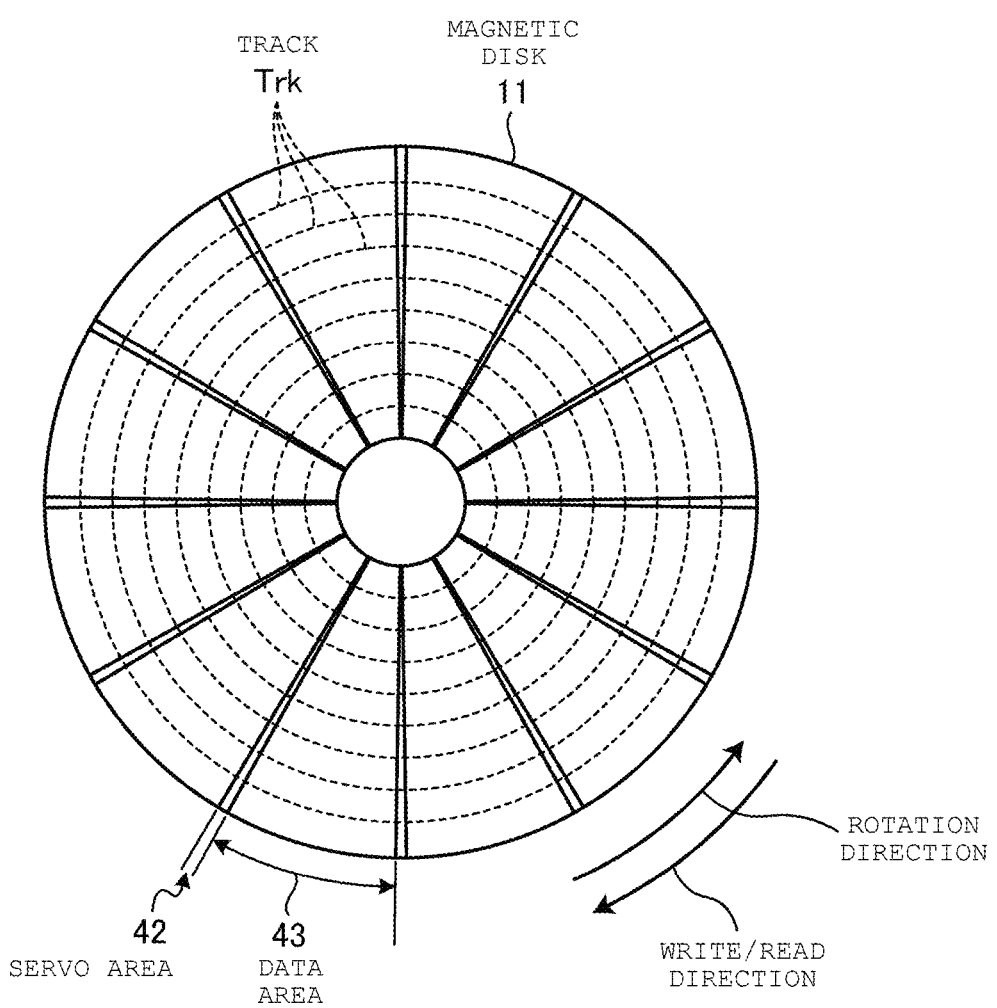
FIG. 2 is a schematic diagram showing an example of a configuration of a magnetic disk according to the first embodiment.

FIG. 2 is a schematic diagram showing an example of a configuration of the magnetic disk 11 according to the first embodiment. An example of a rotation direction of the magnetic disk 11 is shown in this drawing. The magnetic head 22 moves relative to the magnetic disk 11 as the magnetic disk 11 rotates. Thus, a write/read direction, that is, a direction in which data is written or read by the magnetic head 22 in a circumferential direction, is opposite to the rotation direction of the magnetic disk 11.

Servo information is written to the magnetic disk 11 during a manufacturing process, for example, by a servo writer or a self-servo write (SSW). According to FIG. 2, servo areas 42 disposed radially are shown as an example of the arrangement of servo areas in which servo information is written. A data area 43 into which data can be written is provided between the servo areas 42.

A plurality of concentric tracks Trk are set in the radial direction of the magnetic disk 11. A plurality of data sectors into which data is written are disposed in a plurality of data areas 43 provided along the tracks Trk.

An area divided by the servo area 42 in the track Trk is referred to as a servo sector. In other words, it can be considered that a plurality of servo sectors are disposed at intervals on each track Trk.

When the magnetic head 22 reads the servo information from the servo sector at the time of accessing the magnetic disk 11, the RWC 25 estimates the current circumferential position and radial position of the magnetic head 22 based on the read servo information. The controller 30 controls the positioning of the magnetic head 22 based on the estimated circumferential position and radial position of the magnetic head 22.

For example, the controller 30 acquires a positioning error amount (positional error amount) as an estimated value of the radial position of the magnetic head 22 (referred to as an estimated radial position). The positioning error amount indicates the amount of deviation from a target track. The controller 30 maintains the magnetic head 22 on the target track by controlling the radial position of the magnetic head 22 so that the positioning error amount becomes close to zero.

During a write operation, the controller 30 sets a write permission range that includes the track center of the target track and has a width in the radial direction, and determines whether the estimated radial position of the magnetic head 22 is included in the write permission range. More specifically, the controller 30 determines whether the magnetic head 22 is included in the write permission range based on comparison between the positioning error amount and a threshold value corresponding to the boundary of the write permission range. When the magnetic head 22 is not included in the write permission range, the controller 30 stops the write operation. Thereafter, when the magnetic head 22 approaches the position where the write operation was stopped after one rotation of the magnetic disk 11, the controller 30 restarts a write operation. A write operation executed after such a write operation is stopped is referred to as a retry write operation.

The threshold value corresponding to the write permission range is referred to as a write off-track slice WOS. In the following description, it is assumed that a positive real number is set as the write off-track slice WOS, and that a range from −WOS to +WOS with respect to the track center of the target track is set as the write permission range.

Servo information used to estimate the radial position of the magnetic head 22 can only be obtained from a plurality of servo sectors disposed at intervals in the circumferential direction. Thus, when the magnetic head 22 is located between the servo sectors, the controller 30 cannot obtain an estimated radial position. Thus, even when it is confirmed based on the servo information that the position of the magnetic head 22 does not deviate from the write permission range, the position of the magnetic head 22 may deviate from the write permission range due to disturbances between the servo sectors, or the like. Such deviation of the position of the magnetic head 22 from the write permission range is referred to as an overrun.

A track pitch, that is, a distance between the track centers of two adjacent tracks, is set in consideration of the overrun. The smaller the track pitch, the larger the storage capacity of the magnetic disk device. However, when the track pitch is excessively small, there is a possibility that user data of tracks adjacent to the target track (hereinafter simply referred to as an adjacent track) will be destroyed due to an overrun.

Consequently, the designer sets the track pitch as small as possible while reducing the possibility that the user data of the adjacent tracks will be destroyed due to an overrun. The designer estimates an overrun distance and sets a track pitch so that the track pitch includes a margin corresponding to the estimated overrun distance.

Figure 3:
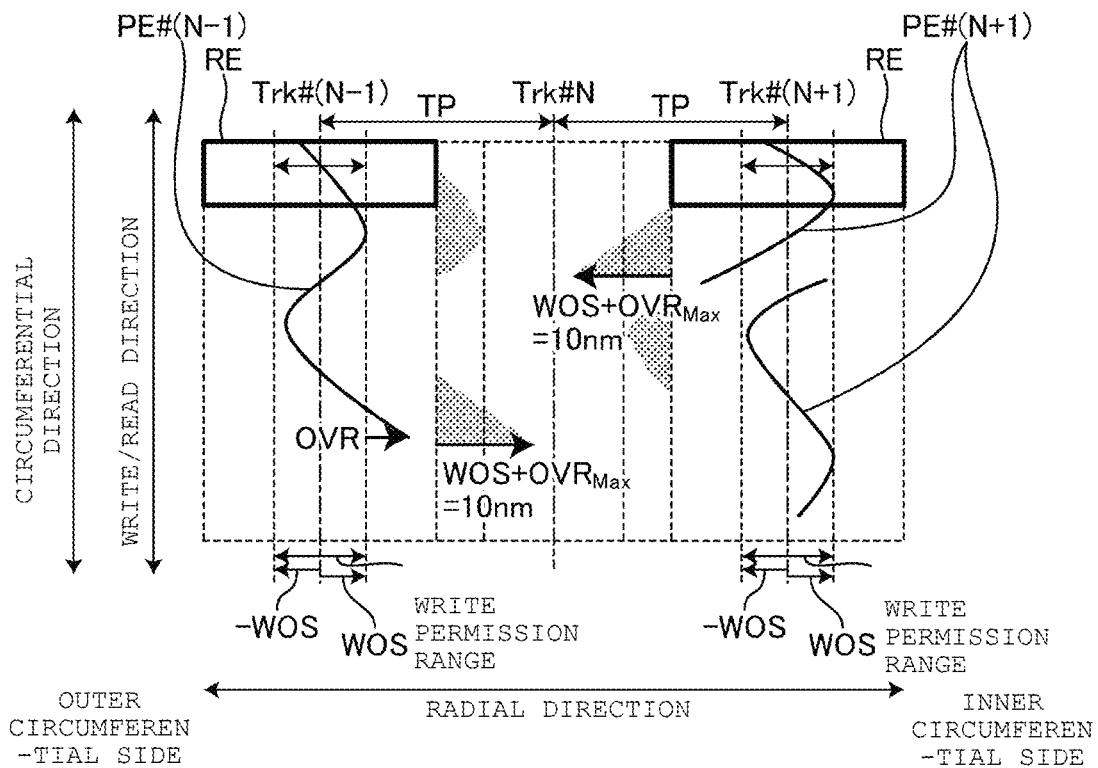
FIG. 3 is a diagram showing an example of a method of setting a track pitch for the magnetic disk device of the first embodiment.

FIG. 3 is a diagram showing an example of a method of setting a track pitch for the magnetic disk device 1 of the first embodiment. In this drawing, three tracks Trk #(N−1), Trk #N, and Trk #(N+1) that are consecutively provided in the radial direction are shown.

Further, in FIG. 3 and the following description, it is assumed that a track number becomes larger toward the inner circumferential side from the outer circumferential side. Further, a positioning error amount is assumed to be numerical information that takes a positive value on the inner circumferential side with respect to a target track and takes a negative value on the outer circumferential side of the target track. Settings according to a track number counting method and settings according to the sign of a positioning error amount are not limited to these examples.

In the example shown in FIG. 3, after a write operation is performed on the track Trk #N, a write operation is executed on each of the track Trk #(N−1) and the track Trk #(N+1). PE #(N−1) is a trajectory of a positioning error amount when the write operation is executed on the track Trk #(N−1). That is, PE #(N−1) indicates a position where data of the track Trk #(N−1) is written. PE #(N+1) is a trajectory of a positioning error amount when the write operation is executed on the track Trk #(N+1). That is, PE #(N+1) indicates a position where data of the track Trk #(N+1) is written.

RE indicates the shape of the write element 22w. In this example, the width of the write element 22w in the radial direction is approximately equal to the widths of the respective tracks Trk.

As shown in FIG. 3, in each of the write operation for the track Trk #(N−1) and the write operation for the track Trk #(N+1), the position of the write element 22w sometimes deviates toward the track Trk #N. Then, a part of an area where the data of the track Trk #N is written is overwritten with the data of the track Trk #(N−1) or the track Trk #(N+1), and thus the width of the area where the data of the track Trk #N is written is squeezed. A dot-hatched area indicates a part in which the area where the data of the track Trk #N is written is lost due to squeezing.

In the width of the track Trk #N, the width lost due to squeezing is referred to as a squeezing amount SQZ.

The positioning error amount PE #(N−1) and the positioning error amount PE #(N+1) can be regarded as mutually uncorrelated random variables. Further, it can be considered that each of the positioning error amount PE #(N−1) and the positioning error amount PE #(N+1) has a normal distribution with a standard deviation OPE. Based on these assumptions, a variance of the squeezing amount SQZ can be expressed as $2\sigma_{PE}^2$. Thus, the standard deviation $\sigma_{SQZ}$ of the squeezing amount SQZ can be expressed as in the following Formula (1).

$$\sigma_{SQZ} = \sqrt{(\sigma_{PE2}^2 + \sigma_{PE1}^2)} = \sqrt{2}\,\sigma_{PE} \quad (1)$$

A maximum value max (PE) of a positioning error amount PE of the magnetic head 22 during a write operation can be estimated to be $k\sigma_{PE}$. k is a constant depending on the number of write operations. For example, when write operations are executed 1000 times, k is 3.09.

Thus, a maximum value max (SQZ) of the squeezing amount SQZ can be predicted by the following Formula (2).

$$\max(SQZ) = k\sigma_{SQZ} \quad (2)$$
$$= k\sqrt{2}\,\sigma_{PE}$$
$$= \sqrt{2}\max(PE)$$

The designer determines a track pitch TP by using the maximum value max (SQZ) obtained by Formula (2) as a track pitch margin TM. Thereby, user data on adjacent tracks is prevented from being destroyed in a write operation. In other words, the user data of the adjacent tracks during the write operation is guaranteed.

Meanwhile, as shown in Formula (3) below, the maximum value max (PE) of the positioning error amount PE can also be considered to be the sum of the write-off track slice WOS and a maximum value of an excess amount OVR from the write-off track slice WOS due to an overrun.

$$\max(PE) = \max(WOS + OVR) \quad (3)$$
$$= WOS + \max(OVR)$$

Assuming that the positioning error amount PE is a random variable with an expected value of zero, the maximum value max (SQZ) of the squeezing amount SQZ can be transformed as shown in Formula (4) below.

$$\max(SQZ) = \sqrt{2}\max(PE) \quad (4)$$
$$= \sqrt{2}\max(WOS + OVR)$$
$$= \sqrt{2}\,(WOS + \max(OVR))$$

Thus, the required track pitch margin TM can also be expressed as in the following Formula (5).

$$TM = \sqrt{2}\,(WOS + \max(OVR)) \quad (5)$$

In FIG. 3, $OVR_{max}$ is the maximum value of the excess amount OVR, that is, max (OVR). According to the example shown in FIG. 3, WOS+max (OVR) is 10 nm. Thus, the track pitch margin TM is determined to be 14 nm based on Formula (5).

For some reason, writing may be performed in a long section while maintaining an expected value of the positioning error amount PE to a level greater than zero and not exceeding the write-off track slice WOS. Such a state of write is referred to as offset writing.

Figure 4:
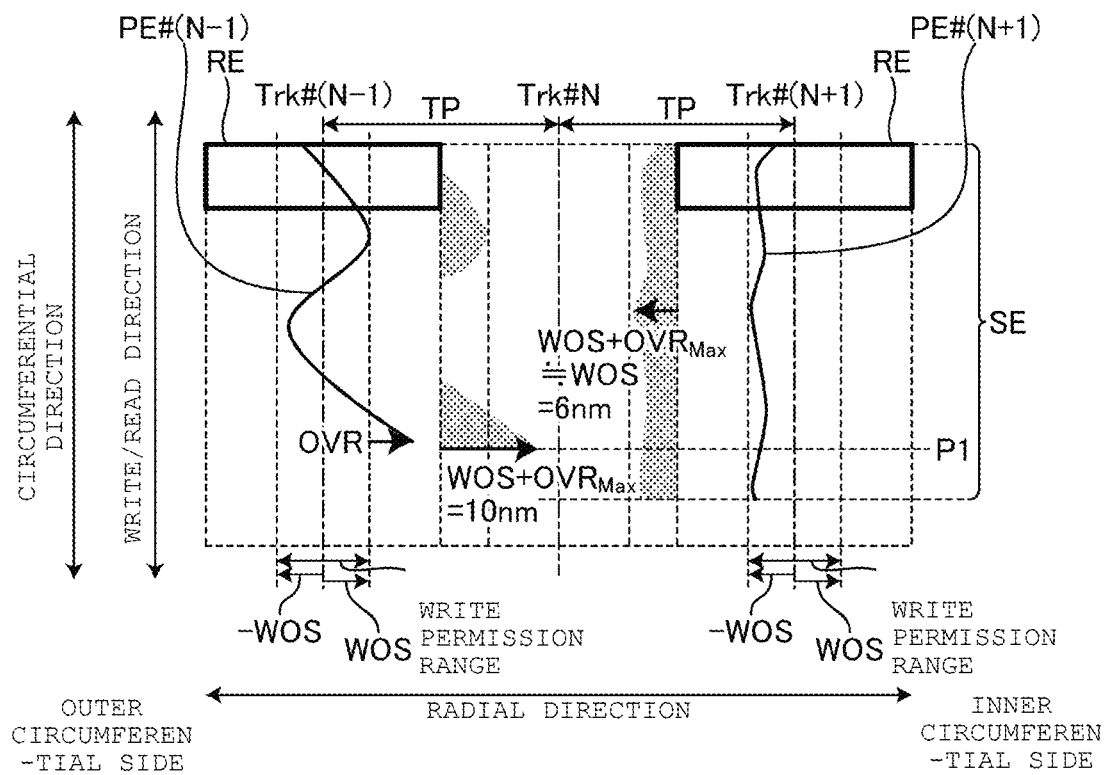
FIG. 4 is a diagram showing an example of offset writing.

FIG. 4 is a diagram showing an example of offset writing. In the example shown in this drawing, during a write operation for the track Trk #(N+1), a positioning error amount is less than WOS in a section SE, but the magnetic head 22 (more specifically, the write element 22w) passes through a position that is continuously offset toward the track Trk #N. In other words, offset writing occurs in the section SE.

When such offset writing occurs, the positioning error amount PE cannot be regarded as a random variable in the section where the offset writing occurs. Thus, a maximum value of the squeezing amount SQZ in the section where the offset writing occurs can be expressed as in the following Formula (6). Formula (6) is an estimated value of the maximum value of the squeezing amount SQZ in a case where offset writing occurs in the tracks Trk on both sides of a certain track Trk.

$$\begin{aligned} \max(SQZ) &= \max(PE1 - PE2) \\ &= \max((WOS + OVR1) - (-WOS + OVR2)) \\ &= 2WOS + \max(OVR1 - OVR2) \\ &= 2WOS + \max(OVR1 - OVR2) \\ &= TM + (2 - \sqrt{2})WOS \end{aligned} \quad (6)$$

From Formula (6), it can be seen that a maximum value of the squeezing amount SQZ is larger than the track pitch margin TM that is determined based on Formula (5). In other words, in such a case, protection of data of adjacent tracks during a write operation cannot be guaranteed.

In the example shown in FIG. 4, offset writing on the track Trk #N side occurs in the track Trk #(N+1). In the section SE where the offset writing occurs, the width of the track Trk #N is squeezed by 6 nm due to the offset writing in the track Trk #(N+1). Then, during a write operation by the track Trk #(N−1), an overrun on the track Trk #N side occurs at a point P1 included in the section SE, and the width of the track Trk #N is squeezed by 10 nm due to the overrun. Thus, the squeezing amount SQZ of the track Trk #N at the point P1 is 16 nm. At the point P1, the squeezing amount SQZ exceeds 14 nm, which is set as the track pitch margin TM, and it becomes difficult to read data of the track Trk #N at the point P1.

In other words, in order to allow offset writing, it is necessary to make the track pitch margin TM larger than a value determined by Formula (5). However, when the value of the track pitch margin TM is increased, the storage capacity of the magnetic disk device 1 is reduced.

Consequently, in the first embodiment, the controller 30 detects offset writing. When offset writing is detected, the controller 30 executes an operation for protecting data of adjacent tracks (referred to as a protection operation). Thereby, it is possible to protect data of adjacent tracks without increasing the track pitch margin TM.

The controller 30 uses a value obtained by integrating two or more estimated radial positions detected after a write operation is started, that is, a positioning error amount, as an evaluation value for offset writing detection. Integration means adding together. This evaluation value is referred to as an integrated offset amount.

In the first embodiment, the controller 30 uses a value $IntPE_1$ obtained by the following Formula (7) as an integrated offset amount. That is, the controller 30 acquires the integrated offset amount by integrating all estimated radial positions detected in a section where a write operation is continued after the write operation is started. S in Formula (7) represents a sector number of a servo sector through which the magnetic head 22 passes.

$$IntPE_1 = \sum PE(S) \quad (7)$$

Figure 5:
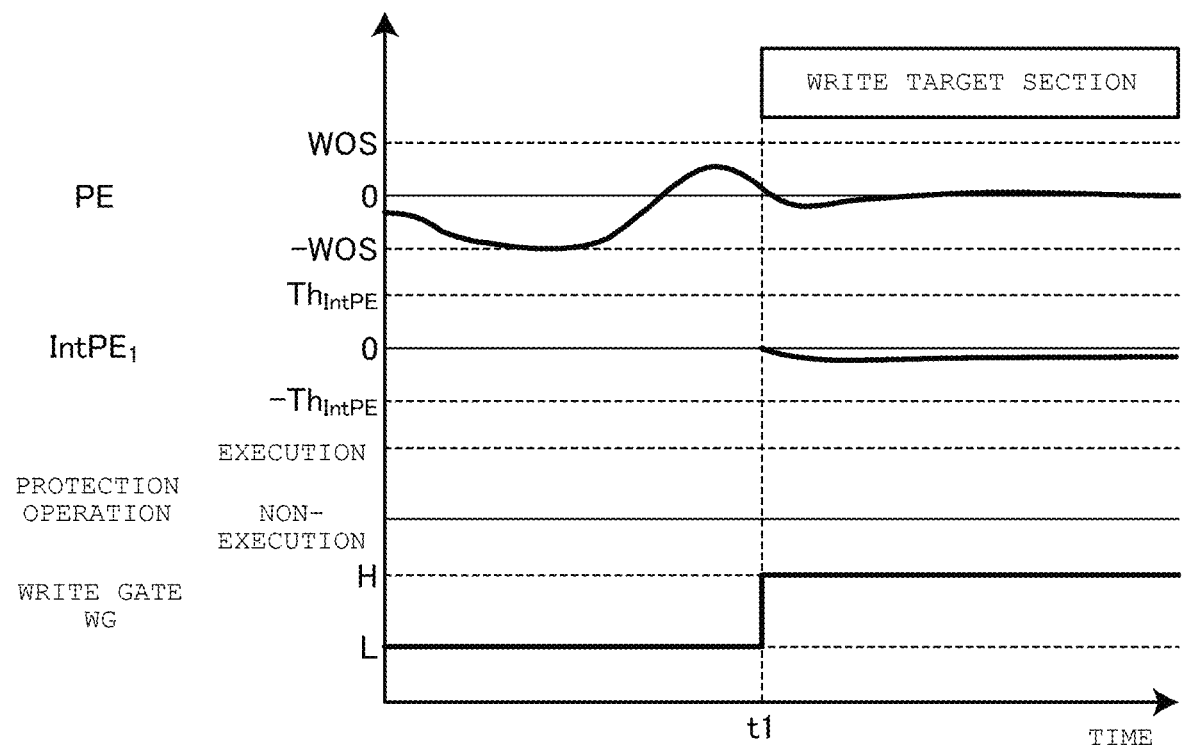
FIG. 5 is a diagram showing a timing at which an integrated offset amount is started to be calculated according to the first embodiment.

FIG. 5 is a diagram showing a timing at which an integrated offset amount is started to be calculated according to the first embodiment. In this drawing, a temporal transition of the positioning error amount PE, a temporal transition of an integrated offset amount, a temporal transition of an execution/non-execution state of a protection operation, and a temporal transition of the state of a write gate WG are shown. The write gate WG is a signal for controlling a timing at which the write element 22w performs writing on the magnetic disk 11. In the examples shown in this drawing and the subsequent drawings, a period during which the write gate WG is "H" indicates a period during which writing to the magnetic disk 11 is performed, and a period during which the write gate WG is "L" indicates a period during which writing to the magnetic disk 11 is not performed.

On a target track, a section in the circumferential direction of a write destination is referred to as a write target section. The write target section includes one or more data sectors. Here, it is assumed that at least a plurality of servo sectors are included between the beginning of the write target section and the end of the write target section.

The controller 30 executes an operation of moving the magnetic head 22 to a target track (that is, a seek operation). The controller 30 completes the seek operation through a settling operation for determining whether a positioning error of the magnetic head 22 on the target track is within a predetermined range. Then, when the magnetic head 22 reaches the beginning of the write target section (timing t1), the write gate WG transitions from an "L" level to an "H" level, and the controller 30 starts a write operation and calculation of the integrated offset amount $IntPE_1$.

The integrated offset amount $IntPE_1$ is reset to 0 at the start of the write operation, and the controller 30 acquires an estimated radial position, that is, the positioning error amount PE, each time the magnetic head 22 passes a servo sector during the write operation. Then, each time the controller 30 acquires the positioning error amount PE, the controller 30 updates the integrated offset amount $IntPE_1$ by integrating the acquired positioning error amounts PE.

A threshold value $Th_{IntPE}$ and a threshold value $-Th_{IntPE}$ that are compared with the integrated offset amount are set in the controller 30. These threshold values are referred to as offset writing threshold values. When the integrated offset amount is included within the range from $-Th_{IntPE}$ to $Th_{IntPE}$, the controller 30 determines that no offset writing occurs. When the integrated offset amount deviates from the range from $-Th_{IntPE}$ to $Th_{IntPE}$, the controller 30 determines that offset writing is occurring. When the integrated offset amount is equal to $-Th_{IntPE}$ or $Th_{IntPE}$, the controller 30 may determine that offset writing is occurring or may determine that offset writing is not occurring.

Figure 6:
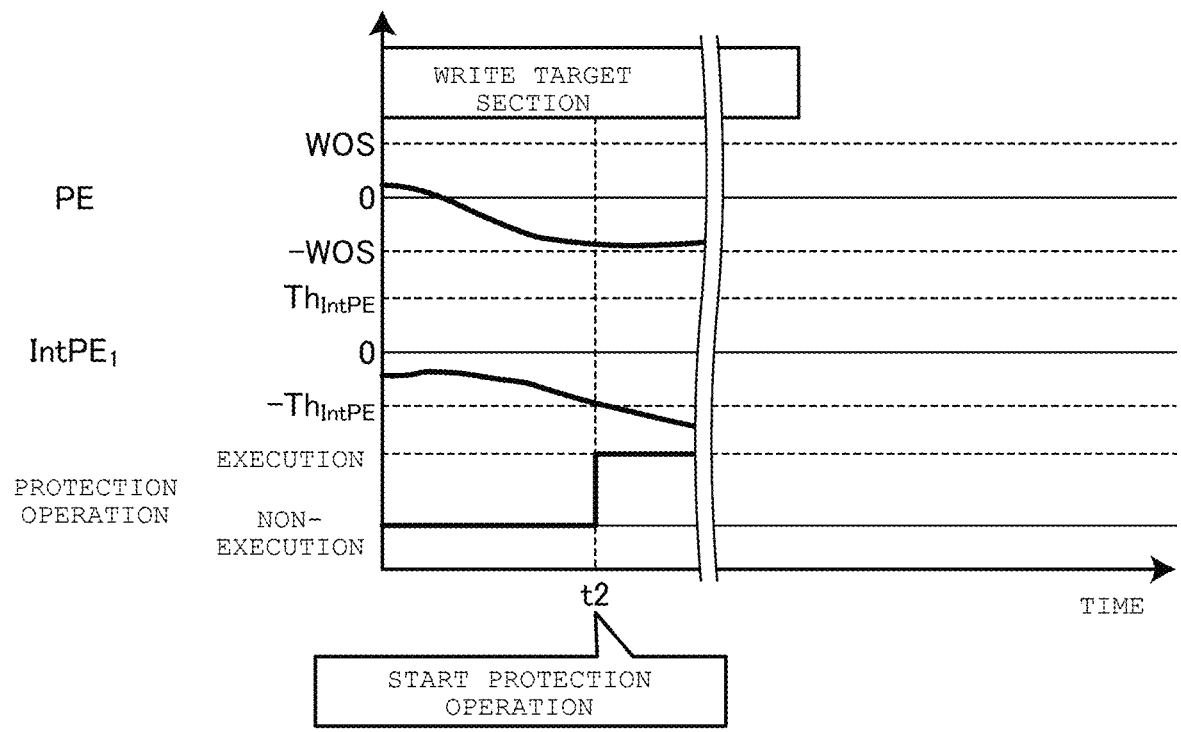
FIG. 6 is a diagram showing a timing at which a protection operation is started according to the first embodiment.

FIG. 6 is a diagram showing a timing at which a protection operation is started according to the first embodiment. In the drawing, a temporal transition of the positioning error amount PE, a temporal transition of an integrated offset amount, and a temporal transition of an execution/non-execution state of a protection operation are shown.

In the example shown in FIG. 6, the integrated offset amount $IntPE_1$ becomes smaller than the offset writing threshold value $-Th_{IntPE}$ during a write operation (timing t2). That is, at the timing t2, the integrated offset amount $IntPE_1$ deviates from a range from $-Th_{IntPE}$ to $Th_{IntPE}$. The controller 30 starts the protection operation in response to the integrated offset amount $IntPE_1$ becoming smaller than $-Th_{IntPE}$.

In the first embodiment, the controller 30 executes a retry write operation in the protection operation.

Figure 7:
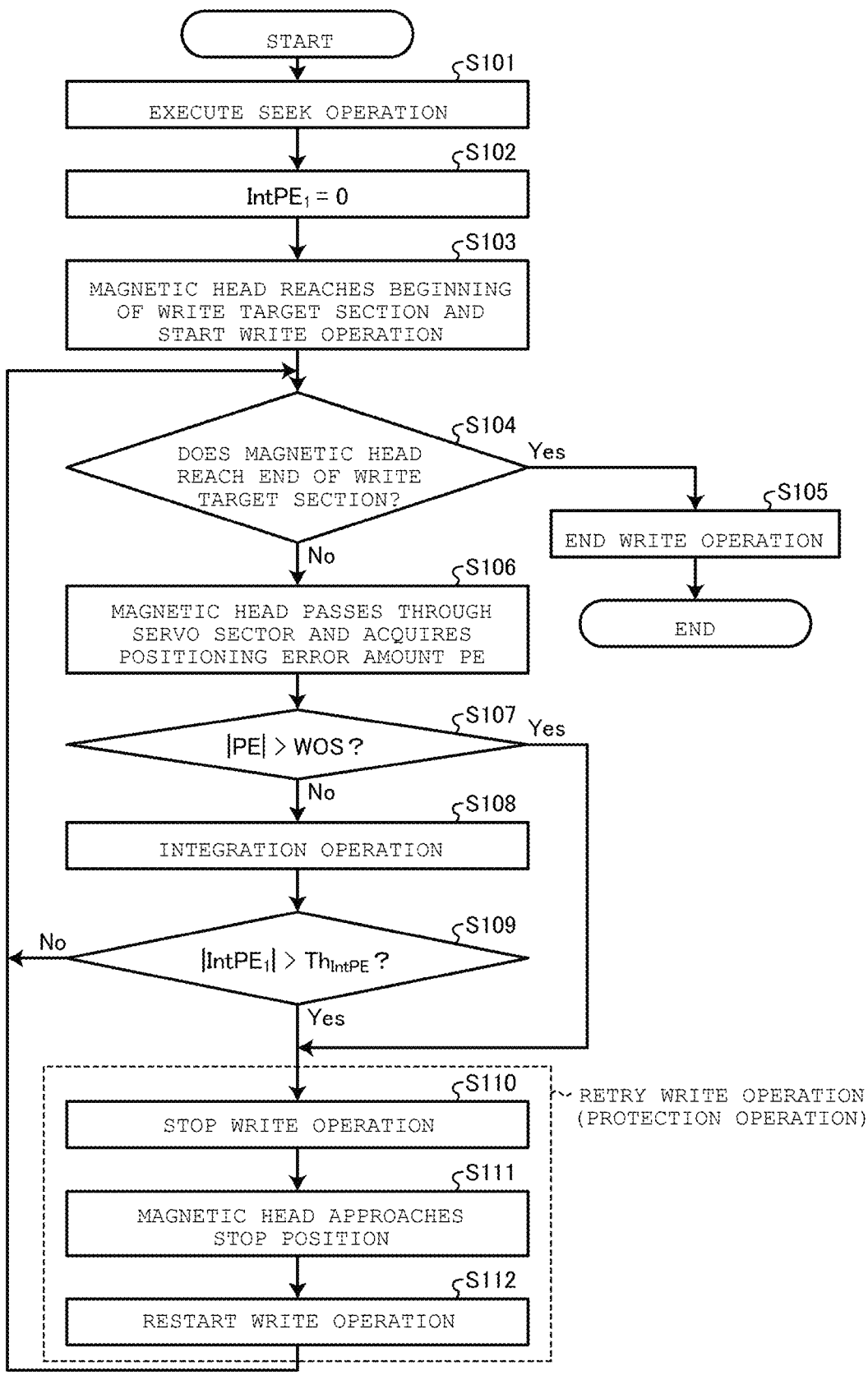
FIG. 7 is a flowchart showing a procedure of a write operation of the magnetic disk device according to the first embodiment.

FIG. 7 is a flowchart showing a procedure of a write operation of the magnetic disk device 1 according to the first embodiment.

The controller 30 first executes a seek operation for moving the magnetic head 22 to the track Trk having a write target section (S101). Further, the controller 30 resets the integrated offset amount IntPE$_1$ to 0 (S102).

When the magnetic head 22 reaches the beginning of the write target section, the controller 30 starts a write operation (S103). The controller 30 causes the write gate WG to transition from an "L" level to an "H" level at a timing when the magnetic head 22 reaches the beginning of the write target section, thereby allowing the magnetic head 22 to start writing to the magnetic disk 11. The controller 30 completes the settling operation by the time the magnetic head 22 reaches the beginning of the write target section.

The controller 30 determines whether the magnetic head 22 reaches the end of the write target section (S104). When the magnetic head 22 reaches the end of the write target section (S104: Yes), the controller 30 ends the write operation (S105), and the series of operations is completed.

When the magnetic head 22 does not reach the end of the write target section (S104: No), the write operation is continued. When the magnetic head 22 passes through the servo sector during the write operation, the controller 30 acquires the positioning error amount PE (S106). Specifically, the magnetic head 22 reads servo information from the servo sector, and the controller 30 acquires the positioning error amount PE from the read servo information.

The controller 30 determines whether an absolute value of the positioning error amount PE is larger than the write-off track slice WOS (S107). That is, the controller 30 determines whether the position of the magnetic head 22 deviates from a write permission range.

When the absolute value of the positioning error amount PE is larger than the write-off track slice WOS (S107: Yes), that is, when the position of the magnetic head 22 deviates from the write permission range, the controller 30 executes a retry write operation in S110 to S112. The retry write operation will be described later.

When the absolute value of the positioning error amount PE is not larger than the write-off track slice WOS (S107: No), that is, when the position of the magnetic head 22 does not deviate from the write permission range, the controller 30 executes an integration operation (S108). In the first embodiment, the integration operation is to add the positioning error amount PE to the integrated offset amount IntPE$_1$ and update the integrated offset amount IntPE$_1$ with a value obtained by the addition.

The controller 30 determines whether the absolute value of the integrated offset amount IntPE$_1$ is larger than the offset writing threshold value Th$_{IntPE}$ (S109). That is, the controller 30 determines whether the integrated offset amount IntPE$_1$ deviates from a range from $-$Th$_{IntPE}$ to Th$_{IntPE}$.

When the absolute value of the integrated offset amount IntPE$_1$ is not larger than the offset writing threshold value Th$_{IntPE}$ (S109: No), that is, when the integrated offset amount IntPE$_1$ does not deviate from the range from $-$Th$_{IntPE}$ to Th$_{IntPE}$, the control transitions to S104.

When the absolute value of the integrated offset amount IntPE$_1$ is larger than the offset writing threshold value Th$_{IntPE}$ (S109: Yes), that is, when the integrated offset amount IntPE$_1$ deviates from the range from $-$Th$_{IntPE}$ to Th$_{IntPE}$, the controller 30 executes a retry write operation as a protection operation.

That is, the controller 30 stops the write operation in response to determining that the absolute value of the integrated offset amount IntPE$_1$ is larger than the offset writing threshold value Th$_{IntPE}$ (S110). The controller 30 waits for the magnetic disk 11 to rotate once while executing a tracking operation for maintaining the position of the magnetic head 22 on a target track. When the magnetic disk 11 rotates once and the magnetic head 22 approaches the position where the write operation is stopped (S111), the write operation is restarted (S112). Then, the control transitions to S104.

In this manner, according to the first embodiment, the controller 30 executes an integration operation for integrating a positioning error amount each time the magnetic head 22 passes through a servo sector during a write operation for a write target section. The controller 30 executes a protection operation based on the integrated offset amount obtained by integrating the positioning error amount.

Thus, when offset writing is detected, a protection operation is executed, and thus data of adjacent tracks can be protected without increasing the track pitch margin TM. In other words, it is possible to efficiently protect the data of the adjacent tracks.

In the first embodiment, a section for integrating a positioning error amount is limited to a write target section. Since the positioning error amount obtained in a seek operation and a settling operation is excluded from a target for an integration operation, offset writing can be detected with high accuracy.

Furthermore, in the first embodiment, the controller 30 executes a protection operation in response to an absolute value of an integrated offset amount becoming larger than offset writing threshold value.

Thus, it is possible to execute the protection operation when offset writing occurs.

Furthermore, in the first embodiment, in the protection operation, the controller 30 stops the write operation, and restarts the write operation from the position where the write operation is stopped after the magnetic disk 11 rotates once.

Thus, it is possible to protect data of adjacent tracks when offset writing occurs.

As shown in FIG. 7, in the first embodiment, the controller 30 stores the last calculated offset amount without resetting it when a write operation is stopped. Then, when the write operation is restarted, the controller 30 restarts an integration operation using the stored integrated offset amount as an initial value.

The method of calculating the integrated offset amount may be modified in various ways. Modification Examples 1 to 3 will be described below as modification examples of the method of calculating the integrated offset amount.

Modification Example 1

In Modification Example 1, the controller 30 integrates the positioning error amounts PE corresponding to a set number (denoted by i) of servo sectors that are passed through last during a write operation. Specifically, the controller 30 acquires an integrated offset amount IntPE$_2$ using the following Formula (8).

$$IntPE_2 = \sum_{S=n}^{n-1} PE(S) \qquad (8)$$

n is an ID of the last servo sector passed through.

In this manner, in an integration operation, the controller 30 integrates positioning error amounts of the set number of servo sectors that are passed through last among all of the servo sectors that are passed through during a write operation.

By limiting an integration target section to a range close to the current position of the magnetic head 22, it is possible to improve the accuracy of offset writing detection.

The controller 30 may weight the positioning error amounts PE obtained from servo sectors #n to #(n−i) by using a weight W. That is, the controller may acquire an integrated offset amount $IntPE_3$ as shown in Formula (9) below.

$$IntPE_3 = \sum_{S=n}^{n-1} W(S-n)PE(S) \quad (9)$$

W(S−n) is a weight for the servo sectors #n to #(n−i). For example, a larger weight is imparted to a positioning error amount of a servo sector that is closer to the servo sector #n through which the magnetic head 22 passed last. A method of imparting weights is not limited thereto.

In this manner, in an integration operation, the controller 30 may perform weighted addition on positioning error amounts of a set number of servo sectors passed through last among all of the servo sectors passed through during a write operation.

Modification Example 2

According to Modification Example 2, when an absolute value of the positioning error amount PE becomes larger than a threshold value $Th_{PE}$, the controller 30 integrates the positioning error amounts PE with respect to an integrated offset amount. The threshold value $Th_{PE}$ is a value equal to or larger than 0 and equal to or less than the write-off track slice WOS. When the absolute value of the positioning error amount PE is equal to the threshold value $Th_{PE}$, the controller 30 may integrate the positioning error amounts with respect to the integrated offset amount or may not integrate the positioning error amounts with respect to the integrated offset amount.

Furthermore, the controller 30 calculates an integrated offset amount for each of an inner circumferential side of a target track and an outer circumferential side of the target track. The integrated offset amount on the inner circumferential side is referred to as an inner integrated offset amount $IntPE_{4I}$. The integrated offset amount on the outer circumferential side is referred to as an outer integrated offset amount $IntPE_{4O}$.

That is, the controller 30 acquires the integrated offset amounts $IntPE_{4I}$ and $IntPE_{4O}$ by using the following Formulas (10) to (15).

$$IntPE_{4I} = \sum PE_{OvTh_I}(S) \quad (10)$$

$$IntPE_{4O} = \sum PE_{OvTh_O}(S) \quad (11)$$

where, when $PE(S) \geq +TH_{PE}$, (12)

$PE_{OvTh\_I}(S) = |PE(S)|, PE_{OvTh\_O}(S) = 0,$ when $0 \leq PE(S) < +TH_{PE}$, (13)

$PE_{OvTh\_I}(S) = 0, PE_{OvTh\_O}(S) = 0,$ when $PE(S) \leq -TH_{PE}$, (14)

$PE_{OvTh\_I}(S) = 0, PE_{OvTh\_O}(S) = |PE(S)|,$ and when $0 \geq PE(S) > -TH_{PE}$, (15)

$PE_{OvTh\_I}(S) = 0, PE_{OvTh\_O}(S) = 0$

Figure 8:
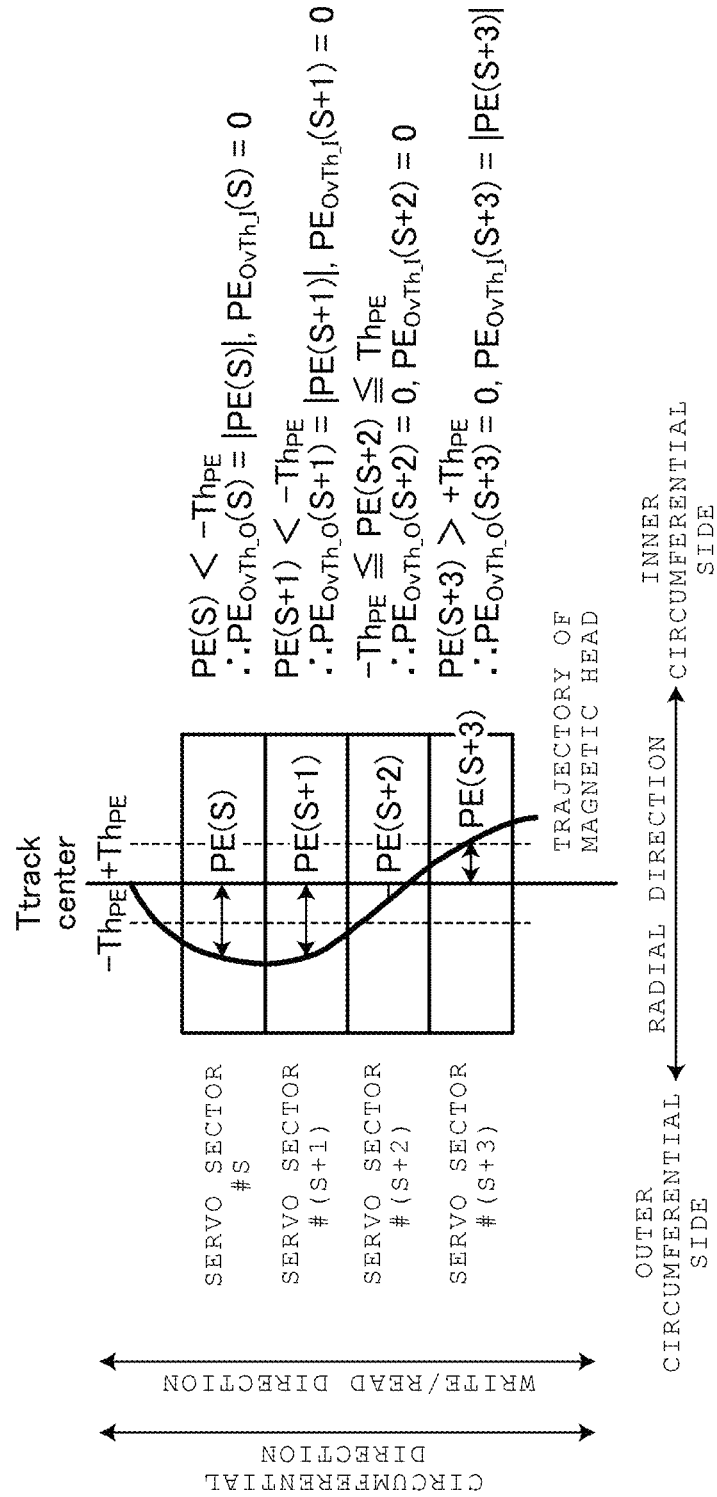
FIG. 8 is a diagram showing a specific example of a method of calculating an integrated offset amount according to a modification example.

FIG. 8 is a diagram showing a specific example of a method of calculating the integrated offset amounts $IntPE_{4I}$ and $IntPE_{4O}$ according to Modification Example 2.

When the magnetic head 22 passes through a servo sector #S during a write operation, the controller 30 acquires a positioning error amount PE(S) from servo information of the servo sector #S. In the example shown in FIG. 8, the positioning error amount PE(S) is smaller than $-Th_{PE}$. Thus, the controller 30 substitutes an absolute value |PE(S)| of the positioning error amount for a positioning error amount $PE_{OvTh\_O}(S)$, and substitutes 0 for a positioning error amount $PE_{OvTh\_I}(S)$. Then, the controller 30 calculates the inner integrated offset amount $IntPE_{4I}$ and the outer integrated offset amount $IntPE_{4O}$ based on these positioning error amounts and Formulas (10) and (11).

When the magnetic head 22 passes through a servo sector #(S+1) during a write operation, the controller 30 acquires a positioning error amount PE(S+1) from servo information of the servo sector #(S+1). In the example shown in FIG. 8, the positioning error amount PE(S+1) is smaller than $-Th_{PE}$. Thus, the controller 30 substitutes |PE(S+1)| for a positioning error amount $PE_{OvTh\_O}(S+1)$, and substitutes 0 for a positioning error amount $PE_{OvTh\_I}(S+1)$. Then, the controller 30 calculates the inner integrated offset amount $IntPE_{4I}$ and the outer integrated offset amount $IntPE_{4O}$ based on these positioning error amounts and Formulas (10) and (11).

When the magnetic head 22 passes through a servo sector #(S+2) during a write operation, the controller 30 acquires a positioning error amount PE(S+2) from servo information of the servo sector #(S+2). In the example shown in FIG. 8, the positioning error amount PE(S+2) is included in a range from $-Th_{PE}$ to $Th_{PE}$. Thus, the controller 30 substitutes 0 for a positioning error amount $PE_{OvTh\_O}(S+2)$ and substitutes 0 for a positioning error amount $PE_{OvTh\_I}(S+2)$. Then, the controller 30 calculates the inner integrated offset amount $IntPE_{4I}$ and the outer integrated offset amount $IntPE_{4O}$ based on these positioning error amounts and Formulas (10) and (11).

When the magnetic head 22 passes through a servo sector #(S+3) during a write operation, the controller 30 acquires a positioning error amount PE(S+3) from servo information of the servo sector #(S+3). In the example shown in FIG. 8, the positioning error amount PE(S+3) is larger than $Th_{PE}$. Thus, the controller 30 substitutes 0 for a positioning error amount $PE_{OvTh\_O}(S+3)$, and substitutes |PE(S+3)| for a positioning error amount $PE_{OvTh\_I}(S+3)$. Then, the controller 30 calculates the inner integrated offset amount $IntPE_{4I}$ and the outer integrated offset amount $IntPE_{4O}$ based on these positioning error amounts and Formulas (10) and (11).

When a positioning error amount PE is added to positioning error amounts PE at other positions even when the influence on adjacent tracks is sufficiently small, such as when the positioning error amount PE is sufficiently close to 0, it may be determined that offset writing occurs due to an absolute value of an integrated offset amount becoming larger than offset writing threshold value.

According to Modification Example 2, the controller 30 integrates positioning error amounts whose absolute values are larger than the threshold value $Th_{PE}$ among the positioning error amounts PE of all of the servo sectors through which the magnetic head 22 passes during a write operation. When the positioning error amount PE is sufficiently close to 0, the controller 30 refrains from adding the positioning error amounts PE, thereby making it possible to improve the accuracy of offset writing detection.

According to Modification Example 2, the controller 30 calculates an integrated offset amount for each of the inner circumferential side of the target track and the outer circumferential side of the target track. The controller 30 does not necessarily need to calculate an integrated offset amount separately for the inner circumferential side of the target track and the outer circumferential side of the target track. In other words, the controller 30 may be configured to integrate the positioning error amounts PE for one integrated offset amount when the absolute value of the positioning error amount PE becomes larger than the threshold value $Th_{PE}$, and may be configured not to integrate the positioning error amounts PE for one integrated offset amount when the absolute value of the positioning error amount PE does not reach the threshold value $Th_{PE}$.

However, an integrated offset amount is calculated for each of the inner circumferential side of the target track and the outer circumferential side of the target track, and thus the following advantages can be obtained.

A case can be considered in which a change in the positioning error amount PE oscillates around a track center and offset writing actually occurs. When an integrated offset amount is calculated without distinguishing between the inner circumferential side of the target track and the outer circumferential side of the target track, offset writing in the above-described case may not be able to be detected or the detection of offset writing may be delayed. By using different integrated offset amounts for the inner circumferential side of the target track and the outer circumferential side of the target track, it is possible to rapidly detect offset writing in the above-described case.

Modification Example 3

In Modification Example 3, the inner integrated offset amount $IntPE_{4I}$ and the outer integrated offset amount $IntPE_{4O}$ according to Modification Example 2 are normalized using the number of servo sectors through which the magnetic head 22 passes. That is, the controller 30 calculates an inner integrated offset amount $IntPE_{5I}$ and an outer integrated offset amount $IntPE_{5O}$ by using Formulas (16) to (21) below. $N_{sI}$ is the number of servo sectors in which an acquired positioning error amount is larger than the threshold value $Th_{PE}$, the servo sectors being included in a section from the start of a write operation to the end of the write operation. $N_{sO}$ is the number of servo sectors in which an acquired positioning error amount is smaller than a threshold value $-Th_{PE}$, the servo sectors being included in a section from the start of the write operation to the end of the write operation.

$$IntPE_{5I} = \frac{\sum PE_{OvTh\_I}}{N_{sI}} \quad (16)$$

$$IntPE_{5O} = \frac{\sum PE_{OvTh\_O}}{N_{sO}} \quad (17)$$

where, when $PE(S) > +Th_{PE}$, (18)

$PE_{OvTh\_I}(S) = |PE(S)|, PE_{OvTh\_O}(S) = 0,$ when $0 \le PE(S) < +Th_{PE}$, (19)

$PE_{OvTh\_I}(S) = 0, PE_{OvTh\_O}(S) = 0,$ when $PE(S) < -Th_{PE}$, (20)

$PE_{OvTh\_I}(S) = 0, PE_{OvTh\_O}(S) = |PE(S)|$ and when $0 \ge PE(S) > -Th_{PE}$, (21)

$PE_{OvTh\_I}(S) = 0, PE_{OvTh\_O}(S) = 0,$

In this manner, in an integration operation, the controller 30 integrates the positioning error amounts PE whose absolute values are larger than the threshold value $Th_{PE}$ among the positioning error amounts of all of the servo sectors through which the magnetic head 22 passes during a write operation, and divides a value, which is obtained by the integration, by the number of servo sectors whose absolute values of the positioning error amounts PE are larger than the threshold value $Th_{PE}$.

Thus, it is possible to prevent determination of excessive offset continuation.

A protection operation may be modified in various ways. Modification Example 4 and Modification Example 5 will be described below as modification examples of the protection operation.

Modification Example 4

In Modification Example 4, tightening of the write-off track slice WOS is executed as a protection operation. The tightening of the write-off track slice WOS is to make the write-off track slice WOS smaller. Thereby, a write permission range is narrowed.

Figure 9:
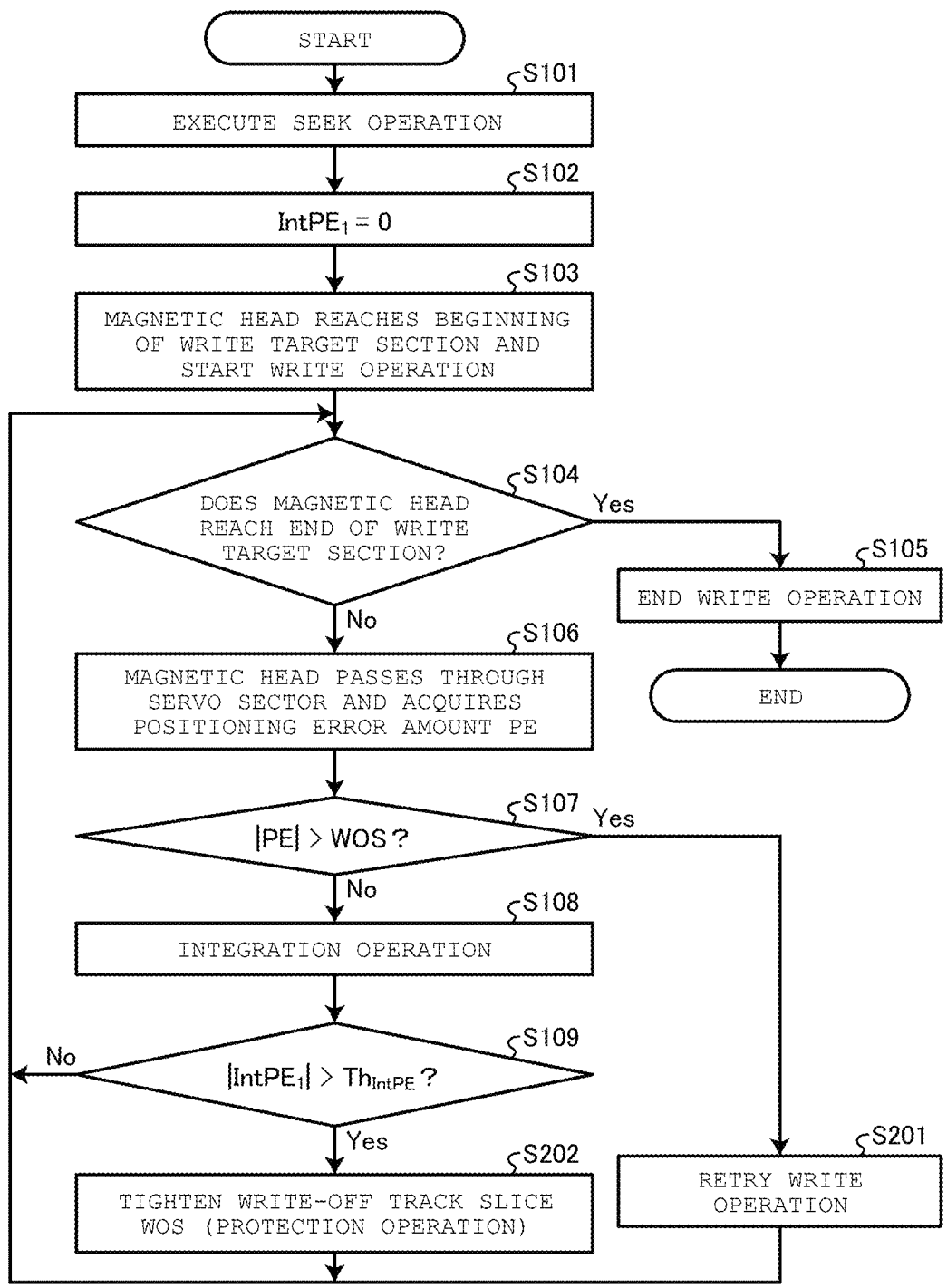
FIGS. 9 and 10 are flowcharts showing a procedure of a write operation of a magnetic disk device according to additional modification examples.

FIG. 9 is a flowchart showing a procedure of a write operation of the magnetic disk device 1 according to Modification Example 4.

Similarly to the first embodiment, the controller 30 executes the processes of S101 to S107. When it is determined in the determination processing of S107 that the absolute value of the positioning error amount PE is larger than the write-off track slice WOS (S107: Yes), the controller 30 executes a retry write operation (S201). The retry write operation is, for example, the processes of S110 to S112 shown in FIG. 7.

When it is determined that the absolute value of the positioning error amount PE is not larger than the write-off track slice WOS (S107: No), the controller 30 executes an integration operation as in the first embodiment (S108).

The controller 30 determines whether the absolute value of the integrated offset amount $IntPE_1$ is larger than the offset writing threshold value $Th_{IntPE}$ (S109).

When the absolute value of the integrated offset amount $IntPE_1$ is not larger than the offset writing threshold value $Th_{IntPE}$ (S109: No), that is, when the integrated offset amount $IntPE_1$ does not deviate from the range from $-Th_{IntPE}$ to $Th_{IntPE}$, the control transitions to S104.

When the absolute value of the integrated offset amount $IntPE_1$ is larger than the offset writing threshold value $Th_{IntPE}$ (S109: Yes), that is, when the integrated offset amount $IntPE_1$ deviates from the range from $-Th_{IntPE}$ to $Th_{IntPE}$, the write-off track slice WOS is tightened (S202).

For example, when a value WOS1 is used as the write-off track slice WOS up to the servo sector #S, and it is determined that the absolute value of the integrated offset amount $IntPE_1$ in the servo sector #S is larger than the offset writing threshold value $Th_{IntPE}$, the controller 30 uses a value WOS2 smaller than the value WOS1 as the write-off track slices WOS in the servo sector #S+1 and the subsequent servo sectors.

After the process of S202, the control transitions to S104.

In this manner, in a protection operation, the controller 30 may perform tightening of the write-off track slices WOS.

Conditions for continuing the write operation become stricter due to the tightening of the write-off track slices WOS, and thus it is possible to protect data of adjacent tracks.

In Modification Example 4, the integrated offset amount $IntPE_1$ according to the first embodiment is used as an integrated offset amount. As the integrated offset amount, the integrated offset amounts of Modification Examples 1 to 3 may be applied.

Modification Example 5

When an off-track write occurs, it is considered that it may be slightly difficult to read adjacent tracks due to the off-track write. Thus, in Modification Example 5, when an off-track write is detected, data of adjacent tracks is rewritten as a protection operation.

Figure 10:
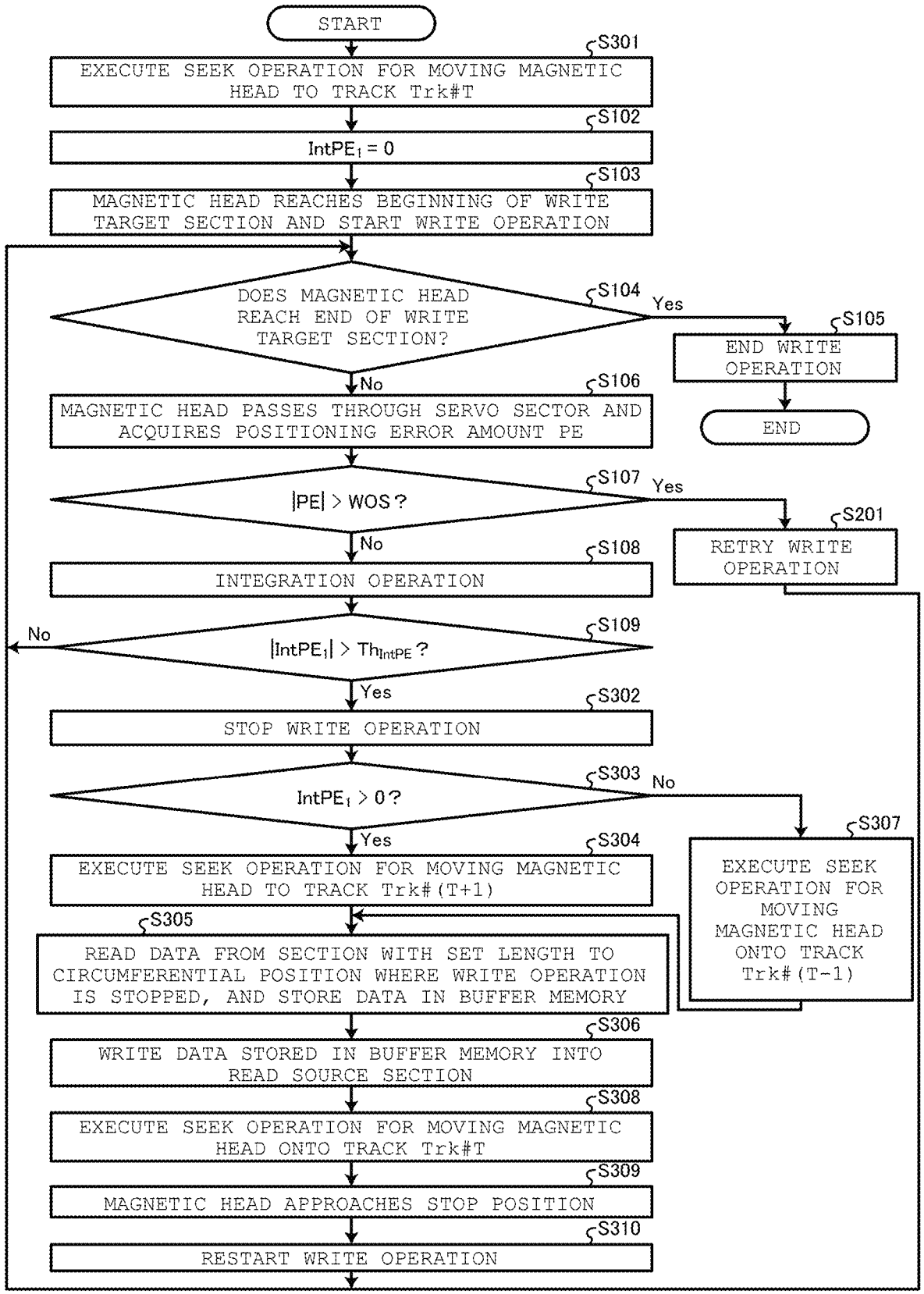

FIG. 10 is a flowchart showing a procedure of a write operation of the magnetic disk device 1 according to Modification Example 5. In the description of this drawing, a write operation in which a certain section of a certain track Trk #T is set as a write target section will be described.

The controller 30 executes a seek operation for moving the magnetic head 22 to the track Trk #T (S301).

Then, in S102 to S107, S201, and S108 to S109, the controller 30 executes the same processing as in Modification Example 4.

In the determination processing of S109, when it is determined that the absolute value of the integrated offset amount $IntPE_1$ is not larger than the offset writing threshold value $Th_{IntPE}$ (S109: No), the control transitions to S104.

When it is determined that the absolute value of the integrated offset amount $IntPE_1$ is larger than the offset writing threshold value $Th_{IntPE}$ (S109: Yes), the controller 30 executes a protection operation according to Modification Example 5.

In the protection operation, the controller 30 first stops the write operation (S302). The controller 30 determines whether the integrated offset amount $IntPE_1$ is larger than 0 (S303).

When the integrated offset amount $IntPE_1$ is larger than 0 (S303: Yes), it is estimated that offset writing on the inner circumferential side is occurring. Thus, the controller 30 executes data rewriting on a track Trk #(T+1) adjacent to the target track on the inner circumferential side.

The data rewriting is executed as follows. First, the controller 30 executes a seek operation for moving the magnetic head 22 onto the track Trk #(T+1) (S304). Then, the controller 30 reads data from a section with a set length to the circumferential position where the write operation is stopped, and stores the read data in the buffer memory 29 (S305). A storage destination is not limited to the buffer memory 29. Data may be stored in any area as long as the data can be temporarily stored in the area.

The set length is, for example, a length spanning a predetermined number of servo sectors. The designer can obtain a range in the circumferential direction in which reading becomes difficult due to the off-track write by experiment or calculation and can set a length corresponding to the range as the set length.

After the process of S305, the controller 30 writes the data stored in the buffer memory 29 to a read source section (S306). In other words, the data read from the section with the set length is rewritten into the section with the set length.

When the integrated offset amount $IntPE_1$ is not larger than 0 (S303: No), it is estimated that offset writing to the outer circumferential side is occurring. Thus, the controller 30 executes data rewriting to a track Trk #(T−1) adjacent to the outer circumferential side of the target track. That is, the controller 30 executes a seek operation for moving the magnetic head 22 onto the track Trk #(T+1) (S307). Then, the controller 30 executes the processes of S305 and S306.

When the data rewriting of the adjacent track is completed, the controller 30 executes a seek operation for moving the target track, that is, the magnetic head 22, to the track Trk #T (S308). Then, when the magnetic head 22 approaches the position where the write operation is stopped (S309), the write operation is restarted (S310). The, the control transitions to S104.

In this manner, in the protection operation, the controller 30 reads data of adjacent tracks and writes the read data to the adjacent tracks.

Thus, even when it may be difficult to read the data of the adjacent tracks due to offset writing, it becomes possible to read the data of the adjacent tracks by rewriting the data of the adjacent tracks. In other words, the data of the adjacent tracks is protected.

Furthermore, as shown in S303, the controller 30 specifies a track to be rewritten out of the two tracks adjacent to the target track based on the sign of an integrated offset amount.

Thus, it is possible to perform rewriting on a track affected by the offset writing.

According to Modification Example 5, when the controller 30 detects the occurrence of offset writing, the controller 30 stops a write operation and executes rewriting for adjacent tracks. The controller 30 may not stop a write operation even when the occurrence of offset writing is detected, but may rewrite data of the adjacent tracks after the write operation for a write target section is completed.

Furthermore, in Modification Example 5, the integrated offset amount $IntPE_1$ according to the first embodiment was used as an integrated offset amount. As the integrated offset amount, the integrated offset amounts in Modification Examples 1 to 3 may be applied.

Second Embodiment

As a protection operation, the first embodiment or Modification Example 4 of the first embodiment, and Modification Example 5 of the first embodiment may be combined. In a second embodiment, a protection operation in which the first embodiment or Modification Example 4 of the first embodiment, and Modification Example 5 of the first embodiment are combined will be described.

FIG. 11 is a diagram showing a protection operation according to the second embodiment.

In the second embodiment, the controller 30 executes a two-stage protection operation. Two types of offset writing threshold values corresponding to the two-stage protection operation are set in the controller 30.

One of the two types of offset writing threshold values is an offset writing threshold value $ThA_{IntPE}$, and the other is an offset writing threshold value $ThB_{IntPE}$. The offset writing threshold value $ThA_{IntPE}$ is smaller than the offset writing threshold value $ThB_{IntPE}$.

For example, at a timing t3, an absolute value of the integrated offset amount $IntPE_1$ becomes larger than the offset writing threshold value $ThA_{IntPE}$. When the absolute value of the integrated offset amount $IntPE_1$ becomes larger than the offset writing threshold value $ThA_{IntPE}$ (S401), the controller 30 executes a first-stage protection operation (S402).

In the first-stage protection operation, the controller 30 executes a retry write operation (S402-1) or tightening of the write-off track slice WOS (S402-2).

In S402-1, the controller 30 executes a retry write operation, similar to the protection operation in the first embodiment. In the retry write operation, the controller 30 stores the integrated offset amount $IntPE_1$ when the write operation is stopped. Then, when the write operation is restarted, the controller 30 uses the stored integrated offset amount as an initial value of the integrated offset amount $IntPE_1$.

In S402-2, the controller 30 executes the tightening of the write-off track slice WOS, similar to the protection operation in Modification Example 4. Here, in the initial state, the controller 30 uses a value WOS0 as the write-off track slice WOS, and sets a value WOS1 smaller than the value WOS0 as the write-off track slice WOS due to the tightening of the write-off track slice WOS.

After the process of S402, at a timing t4, the absolute value of the integrated offset amount $IntPE_1$ becomes larger than the offset writing threshold value $ThB_{IntPE}$. When the absolute value of the integrated offset amount $IntPE_1$ becomes larger than the offset writing threshold value $ThB_{IntPE}$ (S403), the controller 30 executes a second-stage protection operation (S404). In the second-stage protection operation, the controller 30 executes rewriting for adjacent tracks.

In this manner, in response to the absolute value of the integrated offset amount $IntPE_1$ becoming larger than the offset writing threshold value $ThA_{IntPE}$, the controller 30 executes a protection operation different from the rewriting for the adjacent tracks. Then, in response to the absolute value of the integrated offset amount $IntPE_1$ becoming larger than the offset writing threshold value $ThB_{IntPE}$, the controller 30 executes rewriting for adjacent tracks.

The rewriting for adjacent tracks takes a relatively long period of time. According to the second embodiment, a protection operation different from the rewriting for the adjacent tracks is executed at a timing earlier than the timing when the rewriting for the adjacent tracks is executed. Thus, it is possible to reduce the frequency with which the rewriting for the adjacent tracks is executed.

When the tightening of the write-off track slice WOS is performed in S402, the trigger for executing the subsequent second-stage protection operation, that is, the rewriting for the adjacent tracks, is not limited to the integrated offset amount $IntPE_1$ becoming larger than the offset writing threshold value $ThB_{IntPE}$.

For example, when the tightening of the write-off track slice WOS is performed in S402, the rewriting for the adjacent tracks may be executed in response to an absolute value of a positioning error amount becoming larger than the value WOS1. Further, in such a case, the controller 30 may set, as rewrite targets, a section in which offset writing is detected before the tightening of the write-off track slice WOS and a section in which offset writing is detected after the tightening of the write-off track slice WOS.

In the description of the second embodiment, the integrated offset amount $IntPE_1$ according to the first embodiment was used as an integrated offset amount. As the integrated offset amount, the integrated offset amounts in Modification Examples 1 to 3 may be applied.

As described in the first embodiment, all of the modification examples of the first embodiment, and the second embodiment, the controller 30 executes an integration operation for calculating an integrated offset amount during a write operation for a write target section each time the magnetic head 22 passes through a servo sector. The integration operation includes adding up positioning error amounts in two or more servo sectors including at least a servo sector last passed through by the magnetic head 22 among all of the servo sectors passed through by the magnetic head 22 during the write operation for the write target section. The controller 30 executes a protection operation for protecting the data of the adjacent tracks based on the integrated offset amount.

Thus, it is possible to efficiently protect data of tracks adjacent to the target track.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
a magnetic disk that includes a plurality of concentric tracks and a plurality of servo sectors disposed at intervals on the plurality of tracks;
a magnetic head configured to perform writing to and reading from the magnetic disk; and
a controller configured to:
execute an integration operation each time the magnetic head passes through a servo sector during a write operation for a first section of a first track among the plurality of tracks, which is a write target section, so long as a positioning error amount in a servo sector that was most recently passed through by the magnetic head is within a range of a first positioning error threshold value, the integration operation including calculating an integrated offset amount by adding up positioning error amounts in two or more servo sectors including at least the servo sector that was most recently passed through by the magnetic head among all of the servo sectors that were passed through by the magnetic head during the write operation for the first section, and
execute a first protection operation for protecting data of a second track adjacent to the first track among the plurality of tracks based on the integrated offset amount.

2. The magnetic disk device according to claim 1, wherein the integrated offset amount is calculated in the integration operation by adding the positioning error amounts of all of the servo sectors that were passed through by the magnetic head during the write operation.

3. The magnetic disk device according to claim 1, wherein the integrated offset amount is calculated in the integration operation by adding the positioning error amounts of a predetermined number of servo sectors that were most recently passed through by the magnetic head among all of the servo sectors that were passed through by the magnetic head during the write operation.

4. The magnetic disk device according to claim 1, wherein the integrated offset amount is calculated in the integration operation by performing a weighted addition on positioning error amounts of a predetermined number of servo sectors that were most recently passed through by the magnetic head among all of the servo sectors that were passed through by the magnetic head during the write operation.

5. The magnetic disk device according to claim 1, wherein
the integrated offset amount is calculated in the integration operation by adding the positioning error amounts having absolute values that are larger than a second positioning error threshold value among the positioning error amounts of all of the servo sectors that were passed through by the magnetic head during the write operation, and
the second positioning error threshold value is a value equal to or smaller than the first positioning error threshold value.

6. The magnetic disk device according to claim 1, wherein the integrated offset amount is calculated in the integration operation by adding the positioning error amounts having absolute values that are larger than a second positioning error threshold value among the positioning error amounts of all of the servo sectors that were passed through by the magnetic head during the write operation, and dividing a value, which has been obtained by the adding, by the number of the servo sectors having the positioning error amounts with absolute values that are larger than the second positioning error threshold value.

7. The magnetic disk device according to claim 1, wherein the controller executes the first protection operation in response to the absolute value of the integrated offset amount becoming larger than a first integration threshold value.

8. The magnetic disk device according to claim 7, wherein the first protection operation includes stopping the write operation and restarting the write operation from a position where the write operation was stopped, after the magnetic disk returns to the position after rotating once.

9. The magnetic disk device according to claim 8, wherein
when the write operation is stopped, the controller stores a last calculated integrated offset amount and stops the integration operation, and
when the write operation is restarted, the controller restarts the integration operation using the stored integrated offset amount as an initial value.

10. The magnetic disk device according to claim 7, wherein the controller compares the absolute value of the integrated offset amount with a first integration threshold value each time the magnetic head passes the servo sector, and the first protection operation includes decreasing the first positioning error threshold value in response to the absolute value of the integrated offset amount becoming larger than the first integration threshold value.

11. The magnetic disk device according to claim 7, wherein the first protection operation includes reading data from the second track and then writing the read data to the second track.

12. The magnetic disk device according to claim 11, wherein the controller specifies the second track out of two tracks adjacent to the first track based on a sign of the integrated offset amount.

13. The magnetic disk device according to claim 11, wherein
the controller executes a second protection operation for protecting the data of the second track, which is different from the first protection operation, in response to the absolute value of the integrated offset amount becoming larger than a second integration threshold value, and
the second integration threshold value is larger than the first integration threshold value.

14. A method of performing a write operation in a magnetic disk device comprising a magnetic disk that includes a plurality of concentric tracks and a plurality of servo sectors disposed at intervals on the plurality of tracks, and a magnetic head configured to perform writing to and reading from the magnetic disk, said method comprising:
during a write operation for a first section of a first track among the plurality of tracks, which is a write target section:
executing an integration operation each time the magnetic head passes through a servo sector so long as a positioning error amount in a servo sector that was most recently passed through by the magnetic head is within a range of a first positioning error threshold value, the integration operation including calculating an integrated offset amount by adding up positioning error amounts in two or more servo sectors including at least the servo sector that was most recently passed through by the magnetic head among all of the servo sectors that were passed through by the magnetic head during the write operation for the first section; and
executing a first protection operation for protecting data of a second track adjacent to the first track among the plurality of tracks based on the integrated offset amount.

15. The method according to claim 14, wherein the first protection operation includes stopping the write operation and restarting the write operation from a position where the write operation was stopped, after the magnetic disk returns to the position after rotating once.

16. The method according to claim 15, further comprising:
when the write operation is stopped, storing a last calculated integrated offset amount and stopping the integration operation; and
when the write operation is restarted, restarting the integration operation using the stored integrated offset amount as an initial value.

17. The method according to claim 14, wherein the first protection operation includes decreasing the first positioning error threshold value.

18. The method according to claim 14, wherein the first protection operation includes reading data from the second track and then writing the read data to the second track.

19. The method according to claim 14, further comprising:
executing a second protection operation for protecting the data of the second track, which is different from the first protection operation, in response to an absolute value of the integrated offset amount becoming larger than a second integration threshold value,
wherein the second integration threshold value is larger than the first integration threshold value.

20. The method according to claim 19, wherein the second protection operation includes reading data from the second track and then writing the read data to the second track.

\* \* \* \* \*